United States Patent
Noh et al.

(10) Patent No.: US 10,506,610 B2
(45) Date of Patent: Dec. 10, 2019

(54) METHOD FOR ALLOCATING RESOURCE BY CONSIDERING INTER-DEVICE INTERFERENCE IN FULL-DUPLEX WIRELESS COMMUNICATION SYSTEM AND APPARATUS THEREFOR

(71) Applicant: LG ELECTRONICS INC., Seoul (KR)

(72) Inventors: Kwangseok Noh, Seoul (KR); Hyunsoo Ko, Seoul (KR); Kukheon Choi, Seoul (KR); Dongkyu Kim, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 37 days.

(21) Appl. No.: 15/546,869

(22) PCT Filed: Jan. 22, 2016

(86) PCT No.: PCT/KR2016/000714
§ 371 (c)(1),
(2) Date: Jul. 27, 2017

(87) PCT Pub. No.: WO2016/126033
PCT Pub. Date: Aug. 11, 2016

(65) Prior Publication Data
US 2018/0020457 A1 Jan. 18, 2018

Related U.S. Application Data

(60) Provisional application No. 62/113,519, filed on Feb. 8, 2015.

(51) Int. Cl.
*H04W 72/08* (2009.01)
*H04W 24/10* (2009.01)
(Continued)

(52) U.S. Cl.
CPC .......... *H04W 72/082* (2013.01); *H04B 17/24* (2015.01); *H04B 17/345* (2015.01);
(Continued)

(58) Field of Classification Search
CPC combination set(s) only.
See application file for complete search history.

(56) References Cited

U.S. PATENT DOCUMENTS 9,847,819 B2 * 12/2017 Zhu .......................... H04L 5/14
10,231,234 B2 * 3/2019 Noh ..................... H04B 17/345
(Continued)

FOREIGN PATENT DOCUMENTS

| CN | 102474347 A | 5/2012 |
|---|---|---|
| CN | 101785220 A | 7/2019 |

(Continued)

OTHER PUBLICATIONS

Full Duplex Radios; Dinesh Bharadia et all; Stanford University; SIGCOMM'13, Aug. 12-16, 2013, Hong Kong, China. (Year: 2013).*

*Primary Examiner* — Hassan Kizou
*Assistant Examiner* — Deepa Belur
(74) *Attorney, Agent, or Firm* — Birch, Stewart, Kolasch & Birch, LLP

(57) ABSTRACT

The present invention relates to a method and apparatus for allocating a resource by a base station in a wireless communication system supporting full-duplex communication. Specifically, the present invention comprises the steps of: transmitting, to a plurality of UEs, measurement information including time information and information on candidate sub-bands for measuring inter-device interference (IDI); receiving, from the plurality of UEs, IDI measurement results measured according to the measurement information; and performing resource allocation for the plurality of UEs on the basis of the IDI measurement results, wherein the information on candidate sub-bands includes at least one candidate sub-band configured for each of the plurality of UEs on the basis of channel measurement between the base station and the corresponding UE.

10 Claims, 18 Drawing Sheets

(51) Int. Cl.
  *H04W 88/08*    (2009.01)
  *H04B 17/345*   (2015.01)
  *H04W 28/02*    (2009.01)
  *H04L 5/00*     (2006.01)
  *H04W 52/24*    (2009.01)
  *H04B 17/24*    (2015.01)
  *H04L 5/14*     (2006.01)
  *H04W 24/08*    (2009.01)
  *H04W 72/04*    (2009.01)

(52) U.S. Cl.
  CPC .......... *H04L 5/0037* (2013.01); *H04L 5/0094* (2013.01); *H04W 24/10* (2013.01); *H04W 28/0236* (2013.01); *H04W 52/241* (2013.01); *H04W 88/08* (2013.01); *H04L 5/0053* (2013.01); *H04L 5/14* (2013.01); *H04W 24/08* (2013.01); *H04W 72/0446* (2013.01); *H04W 72/0453* (2013.01)

(56) References Cited

U.S. PATENT DOCUMENTS

| | | | |
|---|---|---|---|
| 2007/0254601 A1* | 11/2007 | Li | H04B 7/043 |
| | | | 455/88 |
| 2010/0157924 A1* | 6/2010 | Prasad | H04W 52/346 |
| | | | 370/329 |
| 2011/0222525 A1 | 9/2011 | Kishigami et al. | |
| 2012/0134275 A1 | 5/2012 | Choi et al. | |
| 2013/0310099 A1 | 11/2013 | Van Rensburg et al. | |
| 2014/0126402 A1 | 5/2014 | Nam et al. | |
| 2014/0206367 A1* | 7/2014 | Agee | H04W 28/0236 |
| | | | 455/450 |
| 2017/0085326 A1* | 3/2017 | Li | H04B 17/345 |
| 2017/0302337 A1* | 10/2017 | Liu | H04B 7/005 |

FOREIGN PATENT DOCUMENTS

| | | |
|---|---|---|
| KR | 10-2014-0059031 A | 5/2014 |
| WO | 2013/134930 A1 | 9/2013 |

* cited by examiner (a) Control plane protocol stack (b) User plane protocol stack

| Measuring UE \ Target UE | A | B | C | D | E | BS |
|---|---|---|---|---|---|---|
| A | - | 3.6 | 8.4 | 5.5 | 6.7 | 1 |
| B | 3.6 | - | 9.8 | 7.4 | 10 | 3.5 |
| C | 8.4 | 9.8 | - | 13.4 | 6.5 | 7.5 |
| D | 5.5 | 7.4 | D | - | 9.2 | 6.5 |
| E | 6.7 | 10 | 6.5 | 9.2 | - | 6.5 |
| BS | 1 | 3.5 | 7.5 | 6.5 | 6.5 | - |

METHOD FOR ALLOCATING RESOURCE BY CONSIDERING INTER-DEVICE INTERFERENCE IN FULL-DUPLEX WIRELESS COMMUNICATION SYSTEM AND APPARATUS THEREFOR

CROSS REFERENCE TO RELATED APPLICATIONS:

This application is the National Phase of PCT International Application No. PCT/KR2016/000714, filed on Jan. 22, 2016, which claims priority under 35 U.S.C. 119(e) to U.S. Provisional Application No. 62/113,519, filed on Feb. 8, 2015, all of which are hereby expressly incorporated by reference into the present application.

TECHNICAL FIELD

The present invention relates to a wireless communication system, and more particularly, to a method for allocating resources by considering inter-device interference (IDI) in a full-duplex wireless communication system and apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

In order to assist efficient management of a wireless communication system of a base station, a UE periodically and/or aperiodically reports information on a current channel state to the base station. Since the information on the channel state includes results, which are calculated in consideration of various situations, it is necessary to have a more efficient reporting method.

DISCLOSURE OF THE INVENTION

Technical Task

Based on the above-described discussion, the present invention proposes a method for allocating resources by considering IDI in a full-duplex wireless communication system and apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

In an aspect of the present invention, provided herein is a method for allocating resources by a base station (BS) in a wireless communication system supporting full-duplex radio (FDR), including: transmitting measurement information including candidate sub-band information and time information for measurement of inter-device interference (IDI) to a plurality of user equipments (UEs); receiving IDI measurement results measured according to the measurement information from the plurality of UEs; and performing resource allocation for the plurality of UEs based on the IDI measurement results. In this case, the candidate sub-band information may include one or more candidate sub-bands for each of the plurality of UEs, which are configured based on channel measurement between the BS and each of the plurality of UEs.

Preferably, the measurement information may be transmitted through one of a downlink control channel, a downlink data channel, and a higher layer signaling.

Preferably, the time information may include time offset information for transmission of measurement signals for the candidate sub-bands configured for each of the plurality of UEs. More preferably, the time offset information may be used to determine unit times of the candidate sub-bands based on the number of measuring UEs accumulated before measurement of IDI for the candidate sub-bands.

Preferably, the measurement information may further include information on the average number of UEs configured to measure IDI for the candidate sub-bands and offset information on the number of measuring UEs for each of the candidate sub-bands.

Preferably, the measurement information may further include information for moving a starting point of an IDI measurement unit time configured for each of the candidate sub-bands. More preferably, the information for moving the starting point may be represented as a unit time in which a first unit time configured for a candidate sub-band where measurement is ended and a second unit time configured for a candidate sub-band where measurement is initiated overlap each other.

Preferably, the method may further include transmitting an IDI reference value. In this case, only when the IDI measurement results are equal to or greater than the IDI reference value, the IDI measurement results may be fed back.

Preferably, the IDI measurement results may be transmitted using channel reciprocity.

In another aspect of the present invention, provided herein is a base station for performing resource allocation in a wireless communication system supporting full-duplex radio (FDR), including: a radio frequency unit; and a processor. In this case, the processor may be configured to transmit measurement information including candidate sub-band information and time information for measurement of inter-device interference (IDI) to a plurality of user equipments (UEs); receive IDI measurement results measured according to the measurement information from the plurality of UEs; and perform resource allocation for the plurality of UEs based on the IDI measurement results. In this case, the candidate sub-band information may include one or more candidate sub-bands for each of the plurality of UEs, which are configured based on channel measurement between the BS and each of the plurality of UEs.

Advantageous Effects

According to embodiments of the present invention, resources can be efficiently allocated to user equipments in a full-duplex wireless communication system.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

Figure 1:
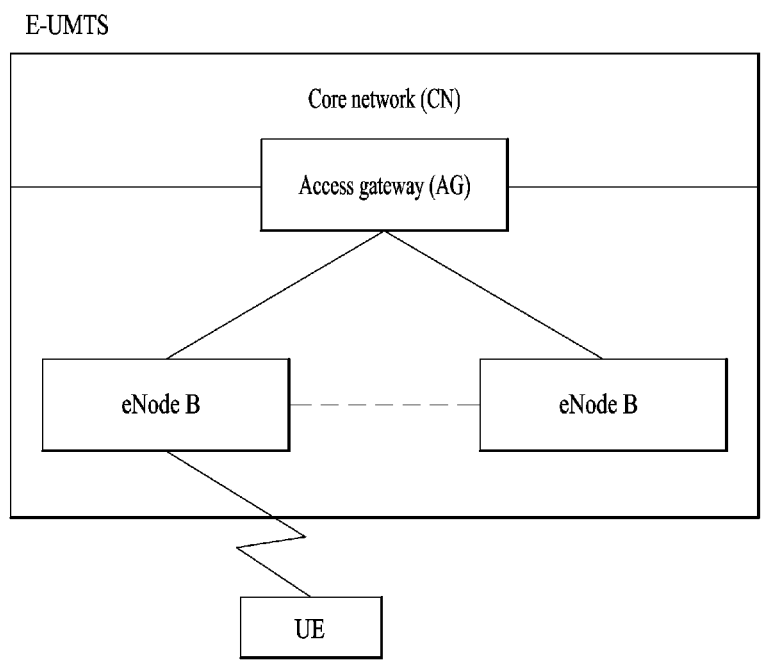
FIG. 1 is a schematic diagram of an E-UMTS network structure as one example of a wireless communication system.
Figure 2:
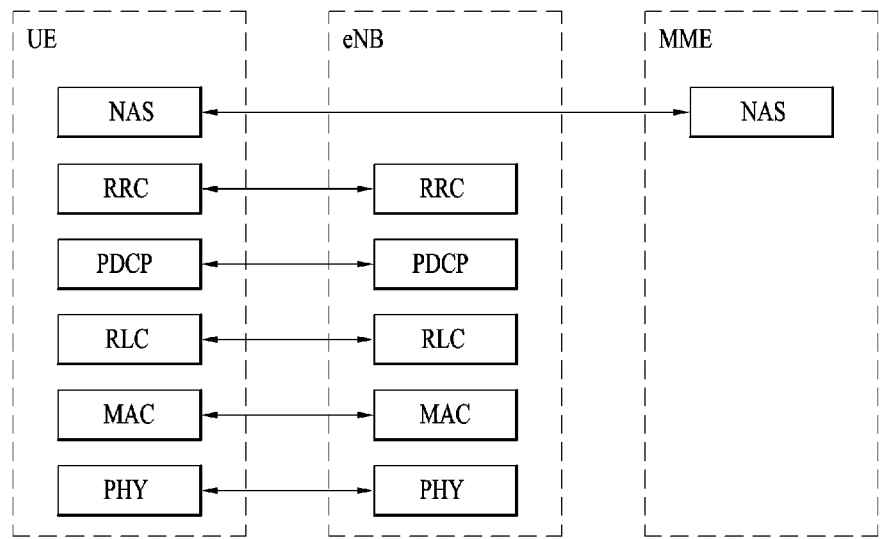
FIG. 2 illustrates structures of control and user planes of a radio interface protocol between a UE and E-UTRAN based on 3GPP radio access network standards.
Figure 2:
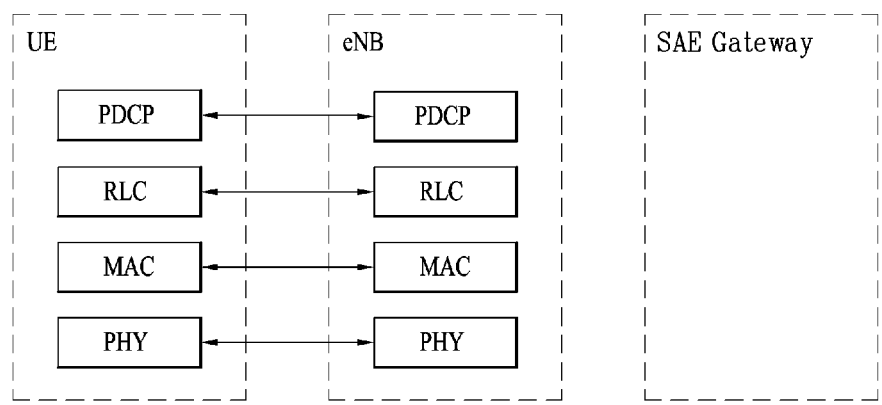

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
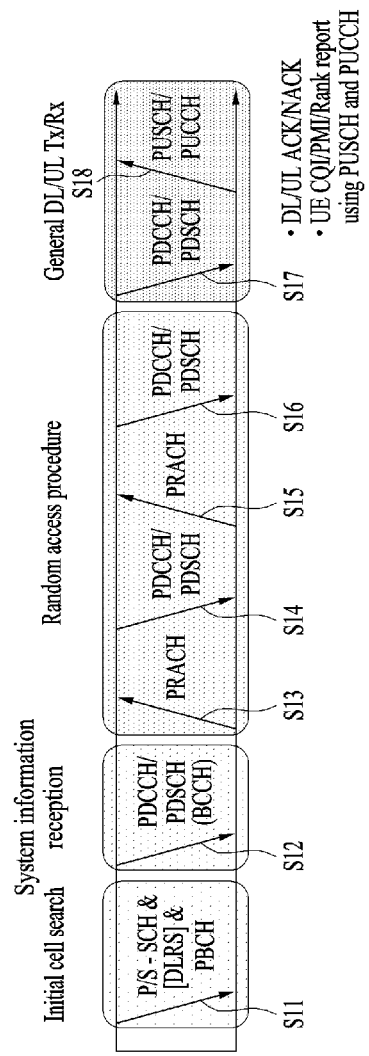
FIG. 3 illustrates physical channels used in the 3GPP LTE system and a general signal transmission method using the same.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
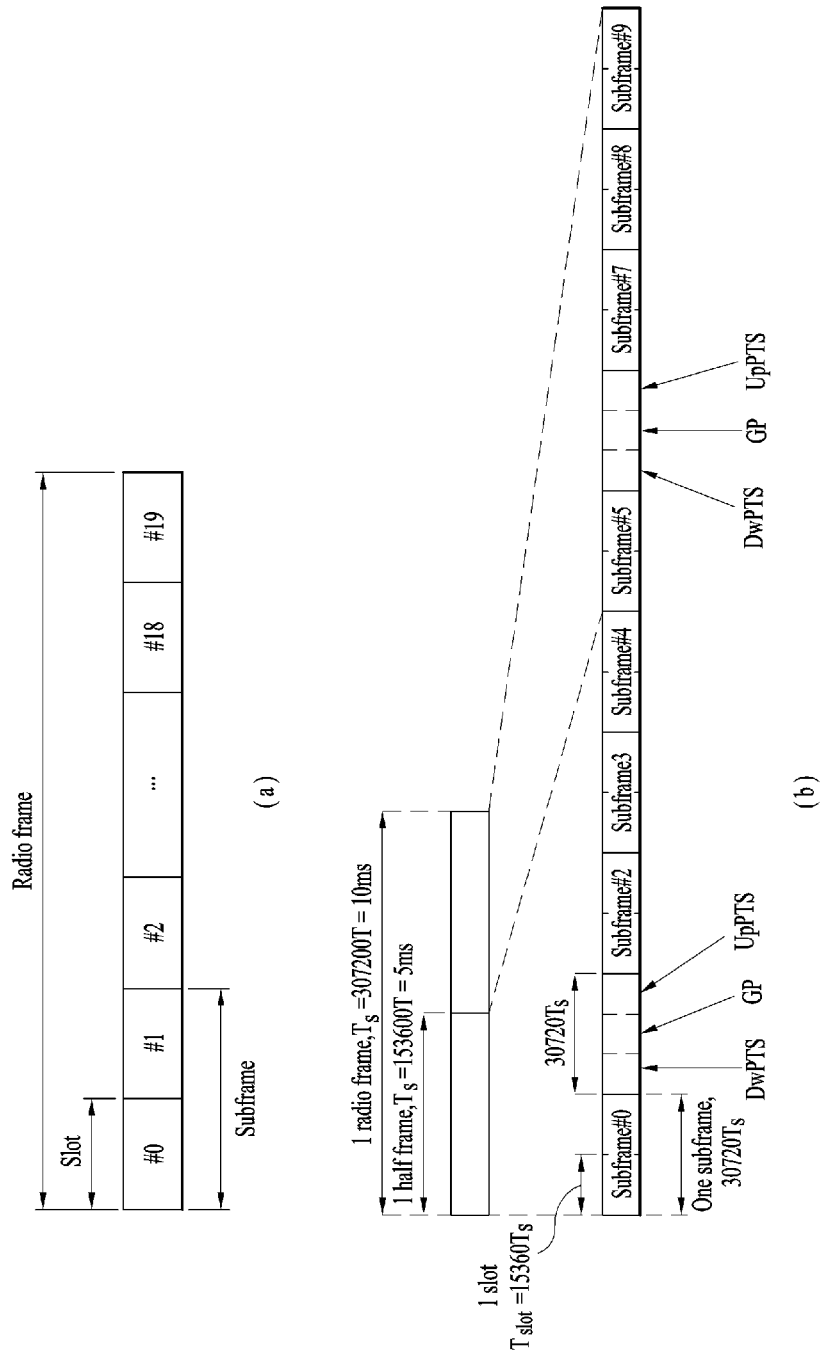
FIG. 4 illustrates a structure of a radio frame used in the LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

TABLE 1

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
| --- | --- | --- | --- | --- | --- | --- | --- | --- | --- | --- | --- |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
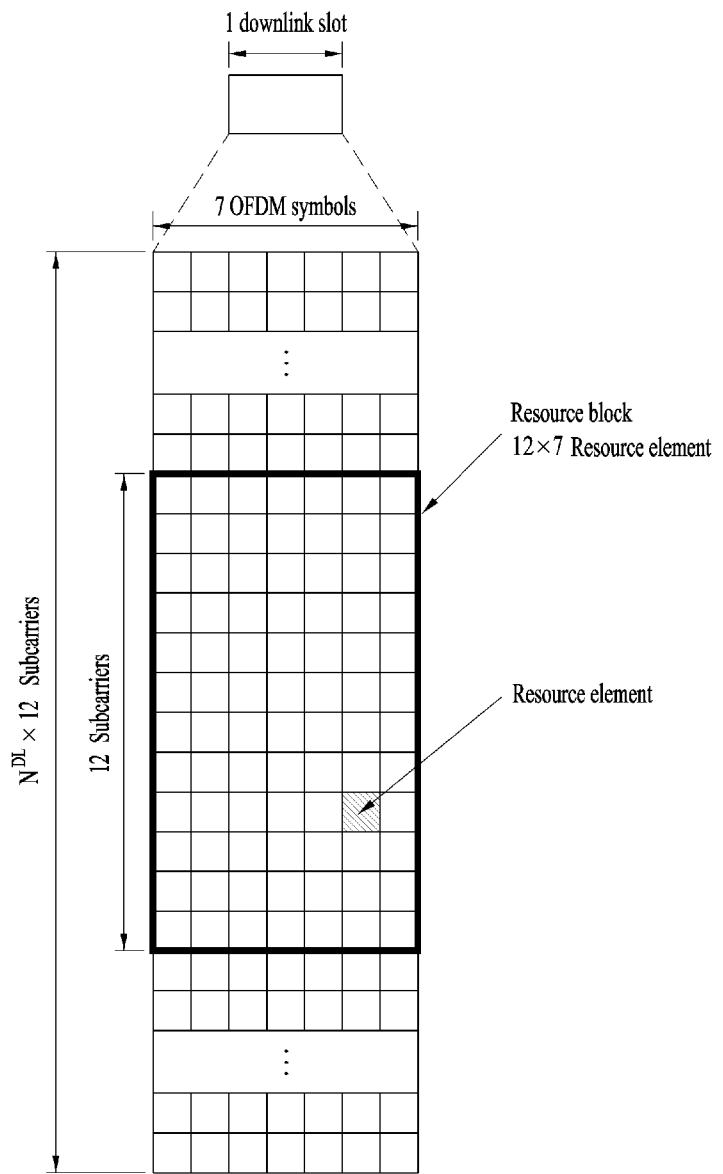
FIG. 5 illustrates a resource grid for a downlink slot.

FIG. 5 illustrates a resource grid for a DL slot.

Referring to FIG. 5, a DL slot includes $N_{symb}^{DL}$ OFDM symbols in the time domain and $N_{RB}^{DL}$ resource blocks (RBs) in the frequency domain. Since each RB includes $N_{sc}^{RB}$ subcarriers, a DL slot includes $N_{RB}^{DL} \times N_{sc}^{RB}$ subcarriers in the frequency domain. While FIG. 5 illustrates that a DL slot incudes 7 OFDM symbols and an RB includes 12 subcarriers, embodiments of the present invention are not limited thereto. For example, the number of OFDM symbols included in a DL slot may be changed according to the length of a cyclic prefix (CP).

Each element in the resource grid is referred to as a resource element (RE). Each RE is indicated by an OFDM symbol index and a subcarrier index. One RB consists of $N_{symb}^{DL} \times N_{sc}^{RB}$ REs. The number of RBs ($N_{RB}^{DL}$) included in a DL slot depends on a DL transmission bandwidth set in a cell.

Figure 6:
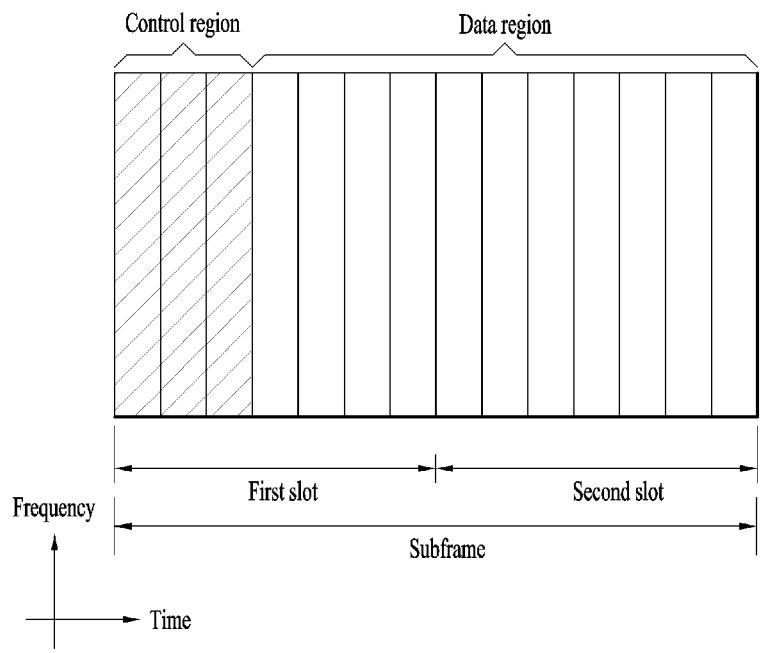
FIG. 6 illustrates a structure of a downlink radio frame used in the LTE system.

FIG. 6 illustrates a structure of a downlink radio frame used in the LTE system.

Referring to FIG. 6, up to 3 (or 4) OFDM symbols located at a head part of a first slot of a subframe correspond to a control region to which a control channel is assigned. And, the rest of OFDM symbols correspond to a data region to which PDSCH (physical downlink shared channel) is assigned. For example, DL control channels used in the LTE system may include a PCFICH (physical control format indicator channel), a PDCCH (physical downlink control channel), a PHICH (physical hybrid ARQ indicator channel) and the like. The PCFICH is transmitted on a first OFDM symbol of a subframe and carries information on the number of OFDM symbols in the subframe used for control channel transmission. The PHICH carries an HARQ ACK/NACK (hybrid automatic repeat request acknowledgment/negative-acknowledgment) signal in response to UL transmission.

Control information transmitted on the PDCCH is called DCI (downlink control information). The DCI includes resource allocation information and other control information for a user equipment or a user equipment group. For instance, the DCI may include UL/DL scheduling information, UL transmission (Tx) power control command and the like.

The PDCCH carries transmission format and resource allocation information of a DL-SCH (downlink shared channel), transmission format and resource allocation information of a UL-SCH (uplink shared channel), paging information on a PCH (paging channel), system information on a DL-SCH, resource allocation information of a higher-layer control message such as a random access response transmitted on a PDSCH, a Tx power control command set for individual user equipments in a user equipment group, a Tx power control command, activation indication information of a VoIP (voice over IP) and the like. A plurality of PDCCHs may be transmitted in a control region. A user equipment can monitor a plurality of PDCCHs. The PDCCH is transmitted on aggregation of one or more consecutive CCEs (control channel elements). In this case, the CCE is a logical assignment unit used in providing the PDCCH with a coding rate based on a radio channel state. The CCE corresponds to a plurality of REGs (resource element groups). The PDCCH format and the number of PDCCH bits are determined depending on the number of CCEs. A base station determines the PDCCH format in accordance with DCI to be transmitted to a user equipment and attaches CRC (cyclic redundancy check) to control information. The CRC is masked with an identifier (e.g., RNTI (radio network temporary identifier)) in accordance with an owner or a purpose of use. For instance, if a PDCCH is provided for a specific user equipment, CRC may be masked with an identifier (e.g., C-RNTI (cell-RNTI)) of the corresponding user equipment. If a PDCCH is provided for a paging message, CRC may be masked with a paging identifier (e.g., P-RNTI (paging-RNTI)). If a PDCCH is provided for system information (particularly, SIC (system information block)), CRC may be masked with an SI-RNTI (system information-RNTI). In addition, if a PDCCH is provided for a random access response, CRC may be masked with an RA-RNTI (random access-RNTI).

Figure 7:
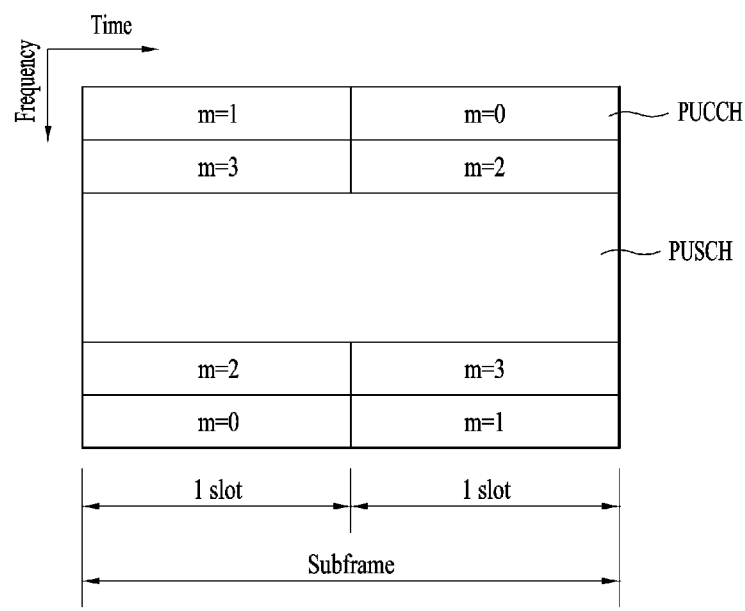
FIG. 7 illustrates a structure of an uplink subframe used in the LTE system.

FIG. 7 illustrates a structure of an uplink subframe used in the LTE system.

Referring to FIG. 7, an uplink subframe includes a plurality (e.g., 2 slots) of slots. Each of the slots may include a different number of SC-FDMA symbols depending on a length of CP. The UL subframe may be divided into a data region and a control region in the frequency domain. The data region includes a PUSCH and is used to transmit such a data signal as audio and the like. The control region includes a PUCCH and is used to transmit UCI (uplink control information). The PUCCH includes an RB pair located at both ends of the data region on a frequency axis and is hopped on a slot boundary.

The PUCCH can be used to transmit the following control information.

SR (scheduling request): This is information used to request a UL-SCH resource and is transmitted using an OOK (on-off keying) scheme.

HARQ ACK/NACK: This is a response signal in response to a DL data packet on a PDSCH and indicates whether the DL data packet has been successfully received. 1-bit ACK/NACK is transmitted as a response to a single downlink codeword and 2-bit ACK/NACK is transmitted as a response to two downlink codewords.

CSI (channel state information): This is feedback information on a downlink channel. The CSI includes a channel quality indicator (CQI). MIMO (multiple input multiple output) related feedback information includes a rank indicator (RI), a precoding matrix indicator (PMI), a precoding type indicator (PTI) and the like. 20-bit is used in each subframe.

The amount of control information (UCI) that a user equipment can transmit in a subframe depends on the number of SC-FDMA symbols available for transmission of the control information. The SC-FDMA symbols available for the transmission of the control information correspond to the rest of SC-FDMA symbols except SC-FDMA symbols used for transmitting a reference signal in the subframe. In case of a subframe in which a sounding reference signal (SRS) is configured, the last SC-FDMA symbol of the subframe is excluded from the SC-FDMA symbols available for the transmission of the control information. The reference signal is used for coherent detection of a PUCCH.

Based on the above-described discussion, a description will be given of a method for allocating resources by simultaneously considering a data transport channel between a BS and a UE and inter-device interference in a system supporting full-duplex radio on the same resource and apparatus therefor.

Figure 8:
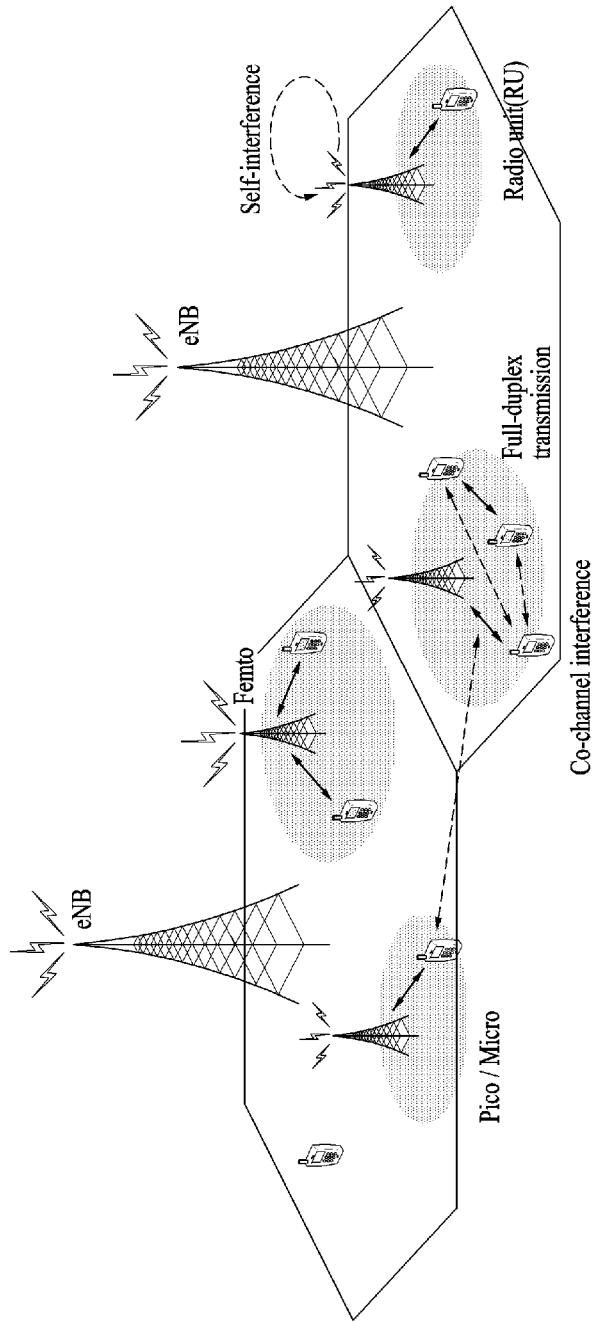
FIG. 8 illustrates a full-duplex radio (FDR) communication system.

FIG. 8 is a reference diagram for explaining a full-duplex radio (FDR) system according to the present invention. Referring to FIG. 8, the FDR system means a system for allowing a transmitting device (e.g., a UE, a BS, etc.) to simultaneously perform transmission and reception using the same resource. In this case, the same resource means a radio resource with the same time and frequency. As shown in FIG. 8, the FDR system may include a BS (eNB) and a UE that support the FDR. Due to the characteristics of the FDR, there may be two types of interference: intra-device interference and inter-device interference. First, the intra-device interference means that a signal transmitted from a transmit antenna of a BS or UE is received by a receive antenna of the BS or UE, thereby acting as interference. The inter-device interference means that an uplink signal transmitted by a BS or UE is received by a neighboring BS or UE, thereby acting as interference.

Hereinafter, details of the inter-device interference (IDI) will be described.

Figure 9:
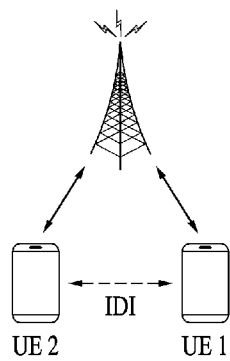
FIG. 9 illustrates inter-device interference (IDI).

FIG. 9 is a reference diagram for explaining IDI. Referring to FIG. 9, the IDI occurs only in the FDR system due to the same resource used in a cell. FIG. 2 is a diagram illustrating the concept of the IDI caused when a BS (eNB) uses the FD mode (i.e., mode for simultaneously performing transmission and reception using the same frequency) on the same resource and when a UE uses the FD mode or HD mode (i.e., half-duplex mode such as the conventional FDD or TDD mode). Although FIG. 9 simply shows two UEs for convenience of description, the present invention can be applied to a case where there are more than two UEs.

Since the legacy communication system using the conventional FD has transmitted and received signals using FDD (frequency division duplex) or TDD (time division duplex), i.e., resources allocated for signal transmission are different from resources allocated for signal reception, the IDI has not been occurred. Even though interference from a neighboring cell occurring in the legacy system is also present in the FDR system, it is not described in the present invention.

Figure 10:
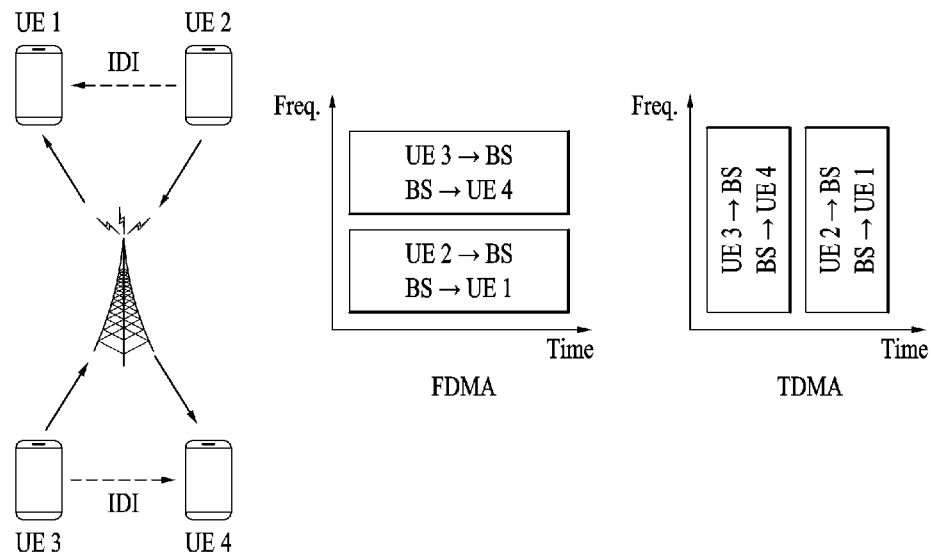
FIG. 10 illustrates multi-access of a UE in the FDR system.

FIG. 10 is a reference diagram for explaining multi-access of a UE in the FDR system. Referring to FIG. 10, not only the full-duplex mode using the same resource but also full-duplex mode using different resources are present in the FDR system. FIG. 10 illustrates examples of FDMA and TDMA operations when a BS operates in the FD mode on the same resource and a plurality of UEs perform multi-access.

In addition, the present invention assumes that in the TDD system using the full-duplex radio on the same resource, a frame configuration for measuring interference between unsynchronized devices and a configuration for attempting to transmit and receive signals for identification between devices are established. Based on the above assumption, it is possible to achieve simultaneous transmission and reception using a UE-specific configuration for allocating different configurations to individual UEs in each cell.

That is, according to the present invention, a unique signature can be assigned to each UE or each UE group to mitigate or cancel IDI after IDI measurement. In this case, a signal for measuring interference from each UE is referred to as a signature signal.

Therefore, after receiving the signature signal, a UE can obtain signal strength of a IDI-causing UE, a UE or signature index, a channel vector such as a phase, timing information and the like. Moreover, the signature signal can be implemented in various forms used for identifying a UE or UE group such as a code sequence, a puncturing pattern, and the like. Unique scrambling or interleaving for a UE or UE group can be applied using the code sequence. To facilitate interference measurement at a receiving UE, the signature signal can be exclusively transmitted by only a single UE or UE group. In this case, a minimum exclusive unit may correspond to an OFDM symbol.

Furthermore, the present invention assumes that a UE group classification (grouping) method for scheduling IDI-causing UEs in the FDR system and an IDI measurement and reporting method for grouping can be applied. That is, the UE group classification method can be applied using the amount of IDI measured by each UE. Additionally, the UE group classification method based on the amount of IDI by considering IDI cancellation/mitigation capability of each UE instead of using the number of UEs sharing the same resources can be applied.

FIG. 10 shows two groups performing FD operation on the same resource. One group consists of UE1 and UE2 and the other group consists of UE3 and UE4. Considering that IDI occurs in each group, UEs with less IDI can be grouped.

For example, interference caused by the UE2 affects the UE4 more than the UE1 and thus, the UE1 and UE2 can be grouped as shown in FIG. 10. In addition, if the IDI caused by the UE2 causes severe negative effects on the UE1, the UE1 and UE2 may not use the same resource. For example, in the case of frequency division multiple access (FDMA), the group consisting of the UE3 and UE4 may use a single frequency band and each of the UE1 and UE2 may use a different frequency band. That is, a total of three frequency bands may be allocated. In this case, although the amount of used resources increases, overall performance (e.g., throughput) may increase, thereby achieving efficient transmission.

That is, it is necessary to define which UEs belong to a group that performs the FD operation on the same resource. To this end, in the related art, resources have been allocated only in consideration of the amount of IDI or IDI channels on the premise that a wideband should be used. However, for each UE, resource allocation can be performed on a sub-band basis. Moreover, when the resource allocation is performed on the sub-band basis, not only IDI but also channels between an BS and UEs should be considered for the resource allocation.

Similar to the method proposed in the present invention, a method for measuring inter-cell interference or a method for selecting a cell based on interference has been widely applied to the coordinated multi-point (CoMP) system. However, there is a difference in that a UE located at a boundary between cells determines its BS by measuring interference from neighboring cells. In addition, in the CoMP communication, interference means signals from a plurality of cells that affects a UE. Moreover, since a UE does not share resources with other UEs in the CoMP system, the UE does not consider IDI from neighboring UEs.

Therefore, the present invention proposes a method for allocating resources on a sub-band basis by considering not only the amount of IDI and channels between UEs but also channels between a BS and the UEs in a system supporting full-duplex radio on the same resource. Specifically, the present invention proposes a method performed by a BS for informing UEs of consecutive windows for UEs where interference measurement is performed in each sub-band, times at which the individual UEs transmit measurement signals through each sub-band, and starting points of the windows.

In the present invention, a procedure for making a group of UEs according to specific standards in a logical or conceptual manner as described above is defined as grouping for convenience of description. In addition, it is assumed that a BS can recognize candidates UEs to be grouped.

Moreover, IDI measurement may mean measurement of reference signal received power (RSRP) or reference signal received quality (RSRQ). In this case, the amount of IDI for each target UE can be defined as shown in Equation 1.

Equation 1

$$\text{IDI amount}=f(\text{distance between measuring UE and target UE, transmit power of target UE, transmission direction of target UE}) \quad [\text{Equation 1}]$$

Moreover, in the present invention, a device (e.g., BS or UE) supporting/operating in full-duplex (FD) mode (i.e., mode for simultaneously performing transmission and reception using the same frequency) on the same resource is referred to as an FDR device, BS, or UE. If an FDR device includes a self-interference canceller, the FDR device can operate in/support the FD mode on the same resource. On the other hand, if an FDR device does not include the self-interference canceller, the FDR device cannot operate in the FD mode on the same resource but exchange information with an FDR device operating in the FD mode on the same resource. In addition, an FDR device can perform IDI measurement and reporting. FIG. 9 shows a case in which a BS corresponds to the FDR device with the self-interference canceller and UE1 and UE2 corresponds to the FDR device without the self-interference canceller.

Hereinafter, a description will be given of an initial group configuration method for indicating which devices in a cell need to share the same resource when FD mode operation can be performed on the same resource.

Referring to FIG. 9, the purpose of the FDR is to increase (e.g., double) a transmission capacity by simultaneously performing data transmission and reception between an BS and UEs. However, the actual transmission capacity may be smaller than (e.g., be reduced as half of) the target transmission capacity due to occurrence of the IDI. In addition, in the related art, resource allocation has been performed on the assumption that the IDI can be avoided or cancelled. However, if channel states between the BS and UEs for the corresponding (frequency) band is severely poor although the avoidance or cancellation of the IDI can be performed, the purpose of the FDR cannot be achieved. Therefore, the present invention proposes methods for allocating resources by considering not only the amount of IDI and IDI channels but also channels between a BS and UEs.

Figure 11:
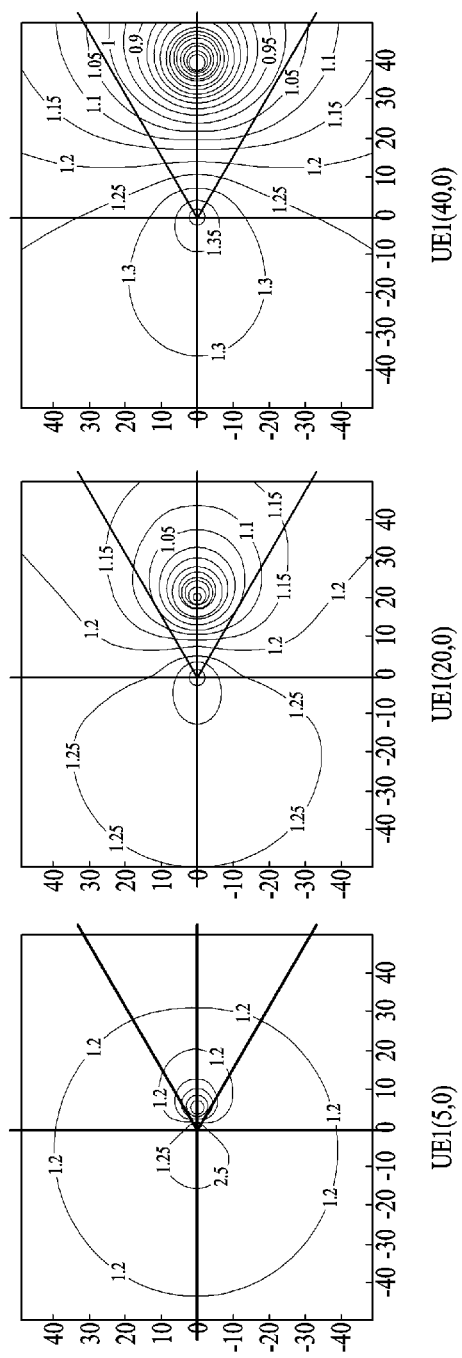
FIG. 11 illustrates a gain ratio between full-duplex (FD) communication and half-duplex (HD) communication schemes according to UE's positions.

FIG. 11 is a reference diagram for explaining a case in which five bands (f1 to f5) obtained by dividing a full band used in the FDR system are allocated to a total of 5 UEs (UE#1 to UE#5).

In FIG. 11, a BS can measure channels with the UEs over the full band and interference between the UEs over the full band for IDI measurement. For the accuracy of the IDI measurement, one UE transmits a measurement signal during a specific unit time and the remaining UEs measure the signal during the specific unit time. Therefore, the number of unit times necessary for all the UEs to complete the IDI measurement corresponds to (the number of UEs)×(the number of divided bands) (e.g., 5×5=25).

Thus, the BS can allocates resources to the UEs based on the amount of IDI and IDI channels measured as described above. However, when the resource allocation is performed as shown in FIG. 11, overhead may extremely increase as the number of UEs and the number of divided bands increase. Therefore, a new method for reducing an IDI measurement time is needed.

That is, the BS can select candidate sub-bands with high allocation probabilities, i.e., good channel environments for the individual UEs based on measurement of channels (desired channels) between the BS and UEs by considering the purpose of the FDR. Thereafter, the BS can instruct the individual UEs to perform the IDI measurement only for the sub-bands selected by the BS. In this case, each UE needs to perform the IDI measurement only for a sub-band allocated to a corresponding UE.

Figure 12:
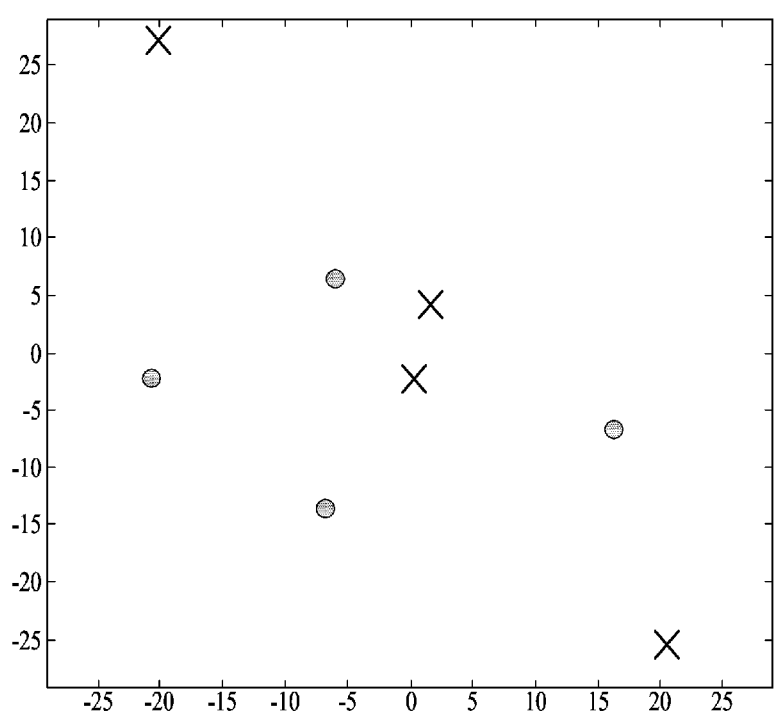
FIG. 12 illustrates a case of selecting some users that use FD mode from a plurality of users.

FIG. 12 is a reference diagram for explaining a case in which a BS informs each UE of a band that should be measured. For example, the BS may instruct UE#1 to perform IDI measurement with respect to f1, f2, f4, and f5 and UE#2 to perform the IDI measurement with respect to f1, f3, and f4.

According to an embodiment of the present invention, the BS can inform each UE of a band and time for transmitting and receiving IDI measurement signals through PDCCH/EPDCCH, PDSCH, or higher-layer signaling.

For example, the BS may inform the number of measuring UEs per band through cell-specific high-layer signaling. That is, the BS may set f1 and f3 to 3 and 2, respectively and then transmit the f1 and S through the cell-specific high-layer signaling to inform the number of measuring UEs per band. In addition, the BS may also transmit information indicating transmission and reception order for each UE on a corresponding frequency using PDCCH/EPDCCH, PDSCH, or UE-specific high-layer signaling. In this case, a measurement time corresponding to the number of measuring UEs is required from the f1 to f5.

Figure 13:
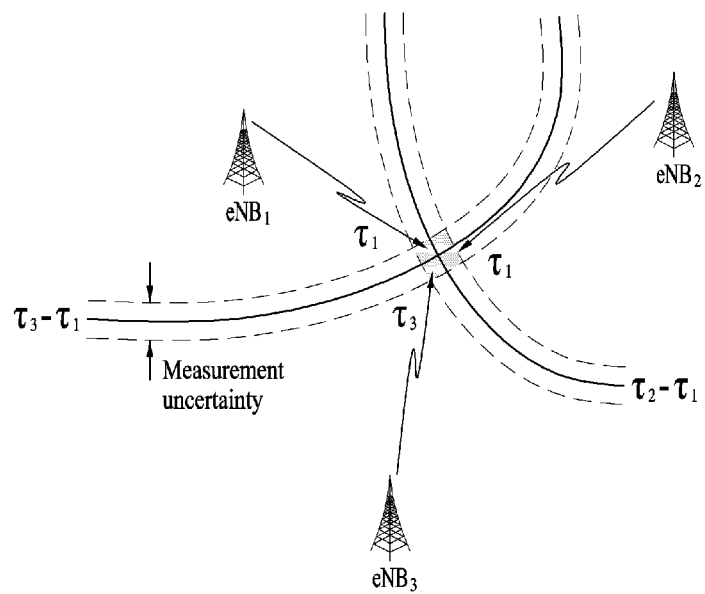
FIG. 13 is a reference diagram for explaining a conventional technique for collecting positions of user devices.

That is, the case of FIG. 12 can be represented as shown in FIG. 13. Referring to FIG. 13, a BS can inform the number of measuring UEs per band, for example, f1=3, f2=3, f3=2, f4=3, and f5=3 through the cell-specific high-layer signaling and transmit a measurement signal transmission time offset to each UE using the PDCCH/EPDCCH, PDSCH, or UE-specific high-layer signaling.

Figures 14, 15:
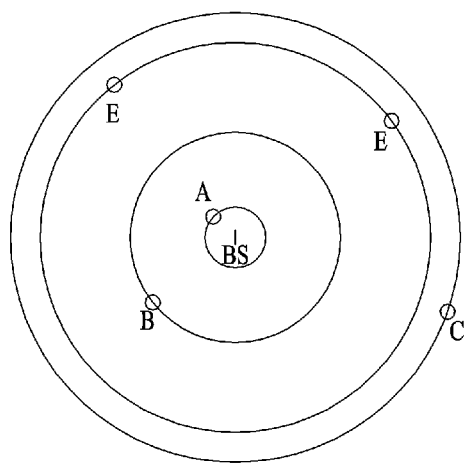
FIGS. 14 and 15 are reference diagrams for explaining distance deployment of a base station (BS) and UEs using a circle centered at the base station.

Thus, each UE can perform measurement signal transmission and reception as shown in FIG. 14 based on the time offset after grasping the number of UEs allocated to each frequency shown in FIG. 12 or 13 (on the assumption that signals are sequentially transmitted starting from the f1). For example, the UE#2 can transmit a signal through the f1 band during a $(0+2)^{th}$ unit time and receive signals during the remaining unit times (e.g., $(0+1)^{th}$ and $(0+3)^{th}$ unit times) except its offset position. In the (x+y) form, x indicates the number of measuring UEs accumulated before a measurement band and y indicates a transmission time offset of the measuring UE on the frequency band. Thus, the UE#2 can transmit a signal through the f3 band during a $(6+1)^{th}$ unit time and receive signals during the remaining unit times (e.g., $(6+2)^{th}$ unit time) except its offset position.

Further, the information transmitted through the cell-specific high-layer signaling is merely an example of the embodiment of the present invention and thus, it is not limited thereto. Thus, after the average number of measuring UEs from the f1 to f5 is informed, the number of measuring UEs in each of the bands f1 to f5 can be obtained using offsets (the average number of measuring UEs from the f1 to f5—the number of measuring UEs in each band). Alternatively, the corresponding information is not limited to the cell-specific high-layer signaling and it can be transmitted using the PDCCH/EPDCCH, PDSCH, UE-specific high-layer signaling.

If a UE has sufficient measurement signal transmit power, the UE can simultaneously transmit measurement signals for a plurality of bands or simultaneously perform signal measurement on the plurality of bands. In this case, the BS can inform each UE of the band and time for IDI measurement signal transmission and reception through the PDCCH/

EPDCCH, PDSCH, or higher-layer signaling. To simultaneously measure the plurality of bands, a starting point of the measurement unit time of each band may be changed.

FIG. 15 illustrates measurement signal transmission times obtained by changing unit times according to an embodiment of the present invention. In FIG. 15, it is assumed that UE#1, UE#2, and UE#4 can simultaneously measure two or more bands and UE#3 and UE#5 can measure one band. In this case, measurement information can be transmitted using the form shown in FIG. 12 or 13. In addition, information for moving a starting point of a unit time of a corresponding band can be transmitted through high-layer signaling.

Figure 16:
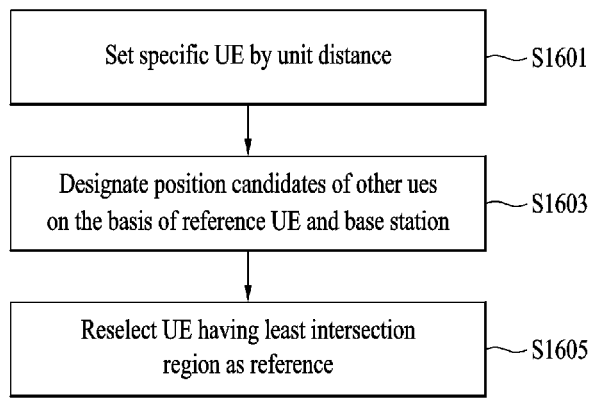
FIGS. 16 to 19B illustrate an embodiment of a method for measuring positions of UEs.

FIG. 16 illustrates information for moving a starting point of a unit time per band. Referring to FIG. 16, when the order of the individual bands can be maintained as described with reference to FIG. 12 (i.e., the order from f1 to f5), a value for moving the unit time can be separately transmitted.

Alternatively, instead of transmitting information to each UE as shown in FIG. 12 or 13, information on measuring UEs allocated to each band can be transmitted. In this case, unit time values overlapping with the previous band order can be additionally transmitted.

Figure 17:
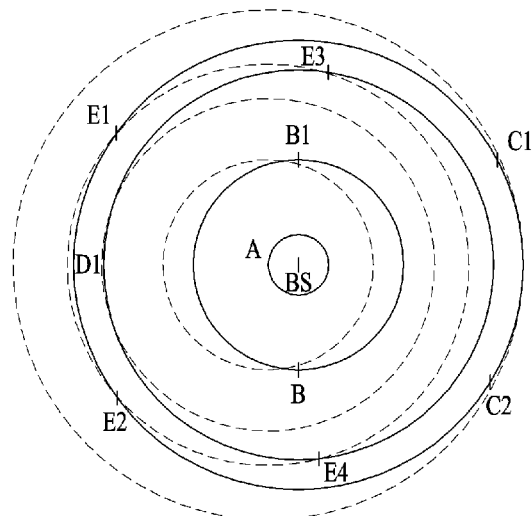
Figure 18A:
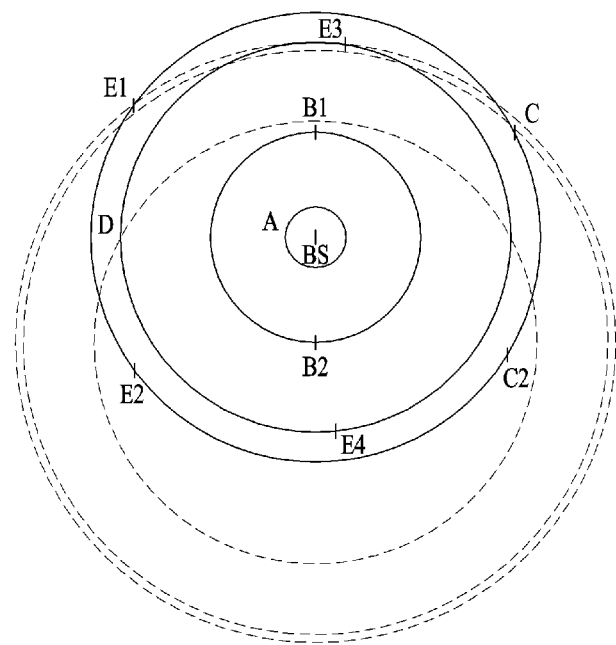
Figure 18B:
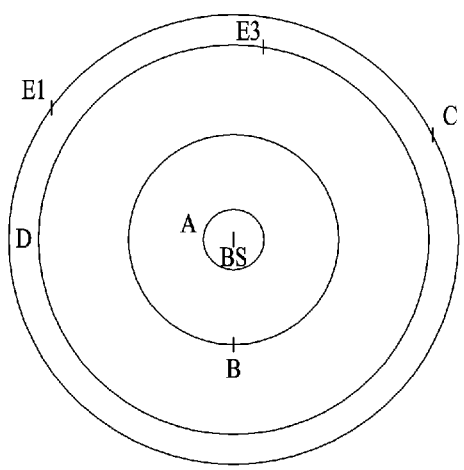

FIGS. 17 and 18 are reference diagrams for describing the number of unit times overlapping with previous band order to configure the time order table for measurement signal transmission shown in FIG. 15.

Referring to FIG. 17, measurement order may be changed in each band and information on measuring UEs may be (sequentially) transmitted as shown in FIG. 17. In this case, a row order indicates band priority. That is, if the current measurement band is the f1, the IDI measurement is performed by UE#3, UE#1, and UE#2, sequentially. In the next band, f4, UE#1 which overlaps with the previous band order, f1 starts the IDI measurement.

In addition, FIG. 18 illustrates the number of unit times overlapping with previous band order. In this case, the overlapping unit time can be represented with reference to the last portion of the unit time of the previous band order.

Thus, it is possible to anticipate total unit times according to Equation 2.

Equation 2

$$(3-2)+(3-2)+(2-0)+(3-1)+(3-0)=9 \quad \text{[Equation 2]}$$

In Equation 2, x of (x-y) form indicates the number of measuring UEs allocated to a corresponding band and it can be received through the information on measuring UEs allocated to each band of FIG. 17. In addition, y indicates the number of next band unit times overlapping with a corresponding band. That is, it relates to information on the configuration for implementing the minimum measurement overhead and time.

Further, when a plurality of bands are measured during one unit time or when a UE has different measurement signal transmit power, a BS should perform power normalization based on feedback from the UE. For example, if all UEs have the same measurement signal transmit power per unit time, IDI measurement power per unit band for UE#3 may be double of that for UE#4. Thus, the IDI measurement power per unit band for UE#3 needs to be reduced by half.

Hereinafter, a description will be given of a method performed by a UE for reporting IDI measurement results to a BS after receiving a measurement instruction from the BS. In this case, the measuring UE can report IDI measurement information through PUSCH, PUCCH, etc. In addition, if the full band is used, a reporting process therefor may be similar to that described in the present invention. The main difference is that IDI measurement information measured for the full band is transmitted as IDI measurement information measured for each band.

The measuring UE can transmit reporting order of the bands to the BS. Alternatively, the reporting order may be determined in advance. Further, to transmit the IDI measurement information, the measuring UE can i) quantize the IDI measurement information or ii) use an index or offset.

In addition, if a value of IDI from a signal-transmitting UE, which is measured by the measuring UE, does not satisfy a specific condition (e.g., if the IDI value is equal to or greater than a specific value or equal to or smaller than the specific value), the measuring UE may not report information on the corresponding band to the BS. In this case, considering that the BS expects to receive feedback with respect to the corresponding band, the UE can inform the BS of how many bands are not reported.

Moreover, the BS can request the UE to provide feedback in a specific situation. For example, if resources are managed such that bands with less IDI are allocated, the BS may transmit an IDI reference value to the UE and then request the UE to provide feedback with respect to an IDI value equal to or smaller than the IDI reference value. That is, the BS may transmit the IDI reference value and an indicator for indicating an IDI value either smaller than or equal to or greater than or equal to the IDI reference value. The IDI reference value can be configured using an offset of the IDI value, which is transmitted by the UE at the previous reporting period.

Since the amount of feedback information from each UE is equal to (the number of bands to be measured)×(the number of UEs−1), channel reciprocity can be used to reduce the amount of feedback. In addition, the channel reciprocity scheme has been used in the related art only when a wide-band is used (the number of sub-bands to be measured=1). However, according to the present invention, the channel reciprocity can be applied to each band.

Based on the feedback measurement results, the BS can perform resource allocation for a band that satisfies the Equation 3 below.

Equation 3

$$a<F\{f(\text{UE1}), f(\text{UE2}), \ldots, f(\text{UEn}), f(\text{IDI})\}<b \quad \text{[Equation 3]}$$

In Equation 3, f(UE1), f(UE2), f(UEn) indicate transmission capacities of UEs when the corresponding band is allocated for the UEs. In addition, f(IDI) is an element for determining resource allocation based on IDI information between the UEs within the corresponding band and F{·} is a function for determining whether to allocate resources based on each element. In this case, if F{·} has a value between the conditions a and b, the corresponding band can be allocated to the corresponding UE.

Figure 19A:
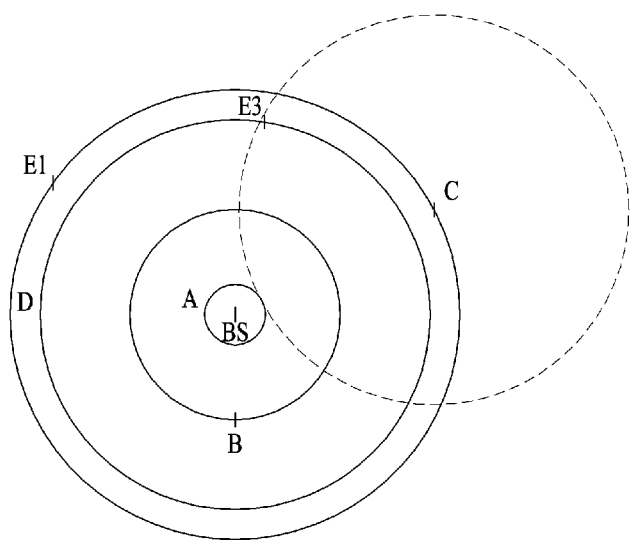
Figure 19B:
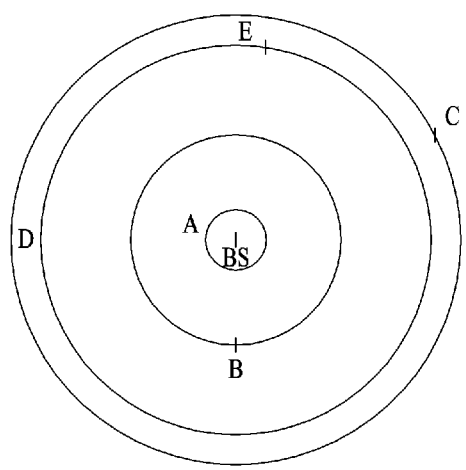
Figure 20:
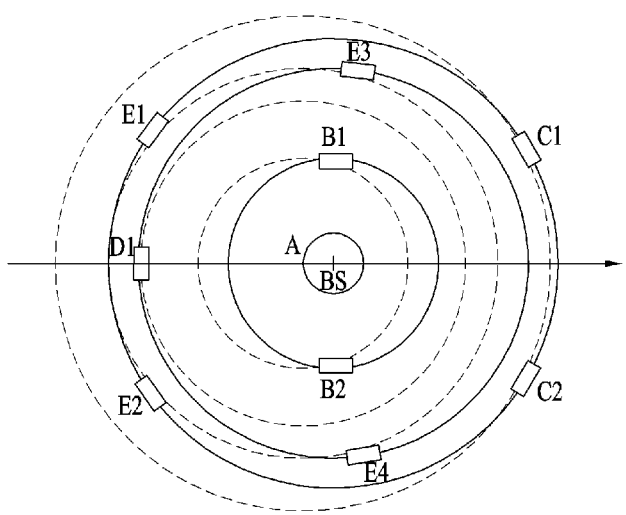
FIG. 20 illustrates a case of designating a candidate set in consideration of a round-off error caused by quantization.
Figure 21:
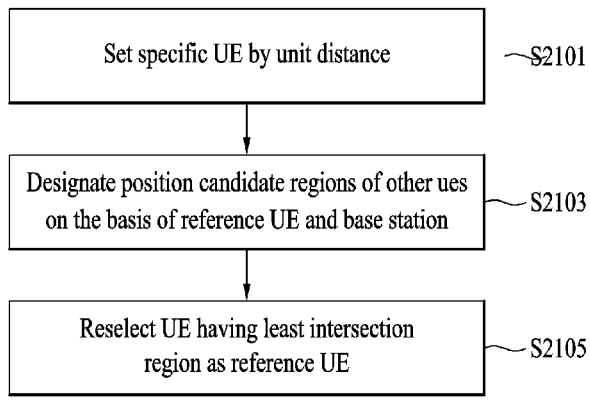
FIG. 21 is a reference diagram for explaining an embodiment of the present invention for considering a round-off error caused by quantization.
Figure 22:
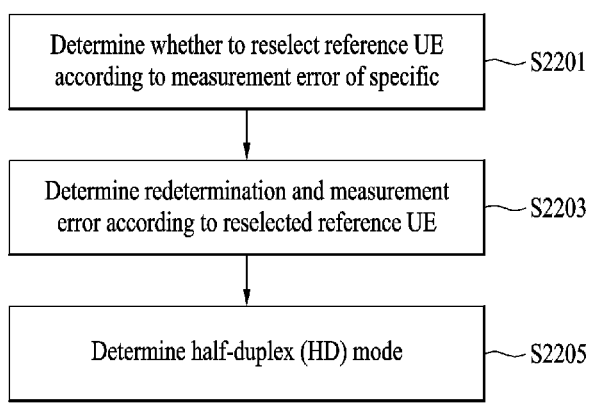
FIG. 22 is a reference diagram for explaining a method for determining that if a measurement error occurs in a certain UE, the UE will operate in half-duplex (HD) mode.
Figure 23:
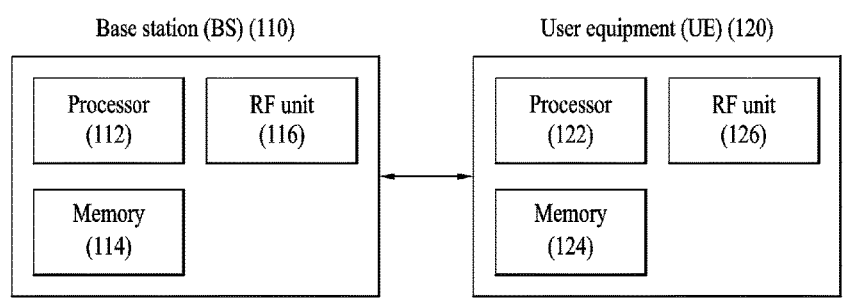
FIG. 23 illustrates a BS and UE applicable to an embodiment of the present invention.

FIG. 19 illustrates a BS and UE applicable to an embodiment of the present invention If a relay node is included in a wireless communication system, communication in a backhaul link is performed between the BS and the relay node and communication in an access link is performed between the relay node and the UE. Therefore, the BS or UE shown in the drawing can be substituted with the relay node in some cases.

Referring to FIG. 19, a wireless communication system includes a base station (BS) 110 and a user equipment (UE) 120. The base station 110 includes a processor 112, a memory 114 and an RF (radio frequency) unit 116. The processor 112 can be configured to implement the procedures and/or methods proposed in the present invention. The memory 114 is connected to the processor 112 and stores various kinds of information related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed in the present invention. The memory 124 is connected to the processor 122 and stores various kinds of information related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNodeB (eNB), an access point and the like.

The embodiments of the present invention may be implemented using various means. For instance, the embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then driven by a processor.

The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although a method for allocating resources based on inter-device interference (IDI) in a full-duplex wireless communication system and apparatus therefor are mainly described with reference to examples applied to the 3GPP LTE system, the method and apparatus can be applied to various wireless communication systems as well as the 3GPP LTE system.

What is claimed is:

1. A method for allocating resources by a base station (BS) in a wireless communication system supporting full-duplex radio (FDR), the method comprising:
    transmitting measurement information to a plurality of user equipments (UEs),
    wherein the measurement information includes information on candidate sub-bands and time for measurement of inter-device interference (IDI) between the plurality of UEs,
    wherein the candidate sub-bands are selected based on channel measurement between the BS and each of the plurality of UEs, and
    wherein the information on time for measurement of IDI is determined based on a number of UEs for transmitting an IDI measurement signal on each of the candidate sub-bands and transmit power capability of each of the plurality of UEs on each of the candidate sub-bands;
    receiving IDI measurement results measured based on the measurement information from the plurality of UEs; and
    performing resource allocation for the plurality of UEs based on the IDI measurement results.

2. The method of claim 1, wherein the measurement information is transmitted through one of a downlink control channel, a downlink data channel, and a higher layer signaling.

3. The method of claim 1, wherein the information on time for measurement of IDI includes time offset information for transmission of the IDI measurement signals for the candidate sub-bands configured for each of the plurality of UEs.

4. The method of claim 3, wherein the time offset information is used to determine unit times of the candidate sub-bands based on a number of measuring UEs accumulated before measurement of IDI for the candidate sub-bands.

5. The method of claim 1, wherein the measurement information further includes information on an average number of UEs configured to measure IDI for the candidate sub-bands and offset information on a number of measuring UEs for each of the candidate sub-bands.

6. The method of claim 1, wherein the measurement information further includes information for moving a starting point of an IDI measurement unit time configured for each of the candidate sub-bands.

7. The method of claim 6, wherein the information for moving the starting point is represented as a unit time in which a first unit time configured for a candidate sub-band where measurement is ended and a second unit time configured for a candidate sub-band where measurement is initiated overlap each other.

8. The method of claim 1, further comprising transmitting an IDI reference value, wherein only when the IDI measurement results are equal to or greater than the IDI reference value, the IDI measurement results are configured to be fed back.

9. The method of claim 1, wherein the IDI measurement results are transmitted using channel reciprocity.

10. A base station for performing resource allocation in a wireless communication system supporting full-duplex radio (FDR), the BS comprising:
- a radio frequency transceiver; and
- a processor,
- wherein the processor is configured to:
- transmit measurement information to a plurality of user equipments (UEs),
- wherein the measurement information includes information on candidate sub-bands and time for measurement of inter-device interference (IDI) between the plurality of UEs,
- wherein the candidate sub-bands are selected based on channel measurement between the BS and each of the plurality of UEs, and
- wherein the information on time for measurement of IDI is determined based on a number of UEs for transmitting an IDI measurement signal on each of the candidate sub-bands and transmit power capability of each of the plurality of UEs on each of the candidate sub-bands;
- receive IDI measurement results measured according to the measurement information from the plurality of UEs; and
- perform resource allocation for the plurality of UEs based on the IDI measurement results.

* * * * *